United States Patent Office 3,480,435
Patented Nov. 25, 1969

3,480,435
PRODUCTION OF PRINTING PLATES AND THE LIKE

William C. Toland, deceased, late of St. Petersburg, Fla., by Edith Toland, executrix, 441 33rd St. N., St. Petersburg, Fla. 33713, and Adam T. Krol, 10501 S. Kildare Ave., Oak Lawn, Ill. 60453

No Drawing. Filed Aug. 19, 1965, Ser. No. 481,451
Int. Cl. G03c 1/66
U.S. Cl. 96—75 26 Claims

ABSTRACT OF THE DISCLOSURE

A method of preparing lithographic printing plates is provided which comprises (a) forming an aqueous solution containing gelatin, sorbitol and oxalic acid, (b) forming an aqueous solution containing gelatin, sorbitol and an amphetamine salt, admixing solutions (a) and (b), coating said solution onto a base member and drying said coating, then coating said base-coated member with an aqueous sensitizer solution containing an amphetamine salt, a colloid, ferric chloride, and a water soluble bichromate, and drying said sensitizer coating.

In addition new an improved light-sensitized articles are provided comprising lithographic printing plates, as well as a substantially non-reticulated gelatin printing plate comprising a base coating in which gelatin is a constituent and a top coating in the form of a thin skin containing a light sensitizer.

Our invention relates to improvements in the production of printing plates and is more especially concerned with the preparation of plates which are useful in lithographic and allied printing operations. Our invention also contemplates new and improved base coatings for printing plates and concerns, also, improvements in sensitizer compositions.

In the usual procedures for preparing lithographic printing plates of the so-called gelatin colloid plate type, a light sensitive gelatin coating, in the form of a solution of gelatin in water to which a hardener such as formaldehyde and a sensitizer, such as sodium, potassium or ammonium bichromate, are added, is deposited upon a printing plate base, which may be any suitable surface such as grained zinc or grained aluminum. The plate is then exposed under a negative to actinic light and inked to provide hardened printing portions and water-swellable non-printing portions.

The deficiencies of such printing plates have been well recognized by those versed in the art. Such plates must be used promptly upon their production, great care and rigid controls must be exercised in their production and use, they can be employed for only relatively short runs, for instance, of the order of 3,000 or 4,000, they tend to produce final printing images with objectionable light spots and dark spots, and they must be operated on the press at relatively high room temperatures and conditions of humidity. This humidity is obtained, in the usual case, in either of one of two ways. Either water is applied to the press or the printing operation must take place at exceedingly high conditions of relatively humidity, and, as indicated above, at elevated temperatures. These latter conditions of operation make for considerable discomfortable for those persons who are required to work in such environments.

Plates such as have heretofore been made, in the general manner described above, have a useful storable life of only a relatively short time. After the passage of such time, they undergo sufficient deterioration so as to require further processing before they can be utilized satisfactorily for printing operations. Even where such plates are utilized for relatively short runs and then set aside, for instance, for several days, before they can be utilized satisfactorily for a printing operation when again placed on the press, they not infrequently require special treatment.

The over-all situation is that, despite certain protential advantages in the use of gelatin as a coating material for sensitized printing plates and the like, its disadvantages have been so many and of such character that, except for certain special types of printing operations, it has fallen into substantial disuse.

In accordance with our invention, which is described hereafter in detail, radical improvements have been effected which very significantly increase the utility of gelatin printing plates and make possible results which were never previously achieved.

It has been well-known in the art dealing with reproductive processes where sensitized gelatin coatings, or, for that matter, other sensitized colloids, were used, that negatives containing any reasonable range of tone values would result in the loss of either the highlight tones or the filling in of the denser tones. This has been especially true in the case of gelatin emulsions whether sensitized with light-sensitive chromic salts such as the bichromates, or, for that matter, with other sensitizers, including, for instance, silver salts. It has, therefore, been a very definite requirement, among other things, in the making of plates utilizing gelatin sensitized coatings, that the negatives be very flat in order to obtain even reasonably satisfactory results. The highlights contrast out completely if a greater number of tone values is present in the original negative, and this generally has been the basis of all photographic processes, both with reference to negatives and prints. In accordane with our invention, a new principle of reproduction has been developed and achieved. In accordance with this principle, the spread of light which is characteristic of the utilization of previously known gelatin coated printing plates is essentially eliminated, and such spread of light is materially reduced. The effect is to produce extremely accurate reproduction or duplication of details which, in accordance with prior procedures utilizing heretofore known gelatin printing plates, have been lost due to the spread of light on contact with the sensitized surfaces.

As we describe below in detail, the new and useful gelatin printing plates of the present invention employ a plurality, specifically, two coatings, a base coating in which gelatin is a constituent, and a top coating in the form of a thin skin containing the light sensitizer, and the transmission of light through both coatings is in substantially straight lines as contrasted with the light spreading which has been characteristic of heretofore produced gelatin printing plates. Plural coatings, broadly, have, per se, long been known in the art, being disclosed, for instance, in U.S. Patents Nos. 32,668 and 1,557,354, and no novelty is claimed herein in any such broad techniques. These long known procedures are ineffective to obtain the important results achieved by our invention.

Printing plates made in accordance with our present invention are substantially non-reticulated. The break-up, in the plates of our present invention, may amount to as many as 3,000,000 per square inch, but each is essentially individual as may be shown by examination under magnification. This results in eliminating the very deep shadows and the pure highlights which have been a part of all previous commercially used reproduction processes. Non-reticulated gelatin printing plates have allegedly heretofore been obtained as described, for instance, in Patent No. 1,453,259. The procedures described in this patent have long been known but it has repeatedly been demonstrated that such known procedures are characterized by important disadvantages so that much has been left to be desired with respect to actual commercial practices following the teachings of said patent. In any event, it is impossible to obtain our results by following the procedures described in said patent. The gelatin printing plates which have heretofore gone into any appreciable commercial use have been of the distinctly reticulated type. The face of the plate reticulated in proportion to the exposure of light. This reticulation broke up the expansion of the light exposure as the spread of light was not so strong as a direct ray. This resulted in small crevices for carrying the water so necessary in lithographic processes, and, at the same time, furnished a planographic line image for printing purposes. The lithographic printing plates made in accordance with our invention are of the intaglio character, printing taking place from the bottom and the holes or apertures which hold the ink vary in depth with the degree of light penetration. In the usual gelatin printing plates, in contrast to ours, printing is effected from the raised or elevated hardened gelatin surfaces.

As we have stated above, in accordance with our principles, the light rays impinging on the sensitized surfaces are essentially not subject to expansion and the result is that reticulation and production of crevices or holes or open spaces between the converted silver grains of the photographic negative is substantially obviated. In this connection, it may be pointed out that when an ordinary silver negative is used with the printing plates of our invention, the silver grains in said negative function, in effect, as a screen, and exceptional tone values in the finished print are obtained in relation to those present in the negative. Thus, for instance, tests under the densitometer have shown, in prints made in accordance with our invention, increases of as much as 3 over the original negative.

Our method for preparing the radically improved lithographic printing plates of the present invention involves, in general, in its particularly preferred embodiments, (a) forming an aqueous solution, preferably acidic in reaction, containing the product or products of the reaction of gelatin, sorbitol, oxalic acid, an amphetamine salt, such as amphetamine sulfate, and an alkali tetraborate, such as potassium tetraborate, (b) coating said solution onto a base member and drying the coating, (c) and then coating the resulting base-coated member with an aqueous sensitizer solution, preferably acid in character, containing an amphetamine salt, such as amphetamine sulfate, a colloid which on drying forms a thin skin, such as sodium carboxymethylcellulose, ferric chloride, a light sensitizer, such as silver compounds, dyes such as diazo dyes, but particularly a water-soluble chromic salt, such as ammonium or sodium or potassium bichromate, and an alkali tetraborate, such as sodium tetraborate. The plate is then dried in a dark room or under a yellow light and it is then exposed for a period of time determined by the nature of the negative, generally, for a matter of seconds to minutes. After exposure, the plate is developed or washed in water until all of the unreacted bichromate sensitizer is removed and it is then dried. This washing step is commonly completed in from 10 to 15 minutes when our invention is practiced in contrast to a time period of approximately 2 hours in conventional present day operations. Before placing the plate on the press, said plate is soaked in an aqueous solution of glycerin, the excess squeegeed off, and the plate is then ready for the press. A small amount of glycerin, e.g. 0.1 to 0.5%, based on the weight of the dry gelatin, may be added to the base coat to enhance the speed of exposure and aid in hardening the base coat and producing better detail but, in general, this is unnecessary.

The following example is illustrative of a particularly preferred embodiment of our invention. It will be understood that said example is not to be construed as limitative of the scope of our invention since, in the light of the guiding principles and teachings provided herein, various changes and modifications will be apparent to those versed in the art.

EXAMPLE (1) To 3200 ml. of tap water there was added 800 grams of 225 bloom gelatin and 8 ml. of a 25% water solution of "Arlex" (a commercial form of sorbitol). The mixture was allowed to stand for about an hour or until all of the water was absorbed by the gelatin to produce a swollen mass, and it was then warmed to 60–65 degrees C. and mixed to form a homogeneous solution. Water was then added thereto to bring the volume to 4000 ml.

(2) To 1000 ml. of the composition of part 1 hereof, 5.2 g. of oxalic acid dissolved in 300 ml. of warm water was added, the mixture was allowed to stand for about 5 to 10 minutes, and then 200 ml. of a 5% aqueous solution of amphetamine sulfate was added. The pH was about 5.

(3) To 1000 ml. of the composition of part 1 hereof, 20 g. of potassium tetraborate dissolved in 300 ml. of warm water was added, the mixture was allowed to stand for a few minutes, and then 200 ml. of a 5% aqueous solution of amphetamine sulfate was added. The pH was about 8.

(4) The compositions of parts 2 and 3 hereof were then mixed together and allowed to stand until all of the air bubbles came to the surface. The composition was then strained through four thicknesses of high grade cheese cloth. The pH of the resulting solution was 6.8. It constitutes the base coating composition.

(5) In the preparation of the printing plate, the base coating composition produced in accordance with part 4 hereof was poured at a temperature of about 60 to 65 degrees C. onto a hot, grained wet aluminum plate, whirled in a conventional whirler at 100 r.p.m. for approximately 90 seconds, and was then set aside, flat, until the coating set, after which it was dried. The drying may be effected in any convenient manner as, for example, by simple air drying or by fan drying.

(6) The top coat solution was prepared by initially admixing 1000 ml. of cool to cold water with 100 ml. of a 1% carboxymethylcellulose aqueous solution (Hercules 7AP), 60 ml. of a 5% amphetamine sulfate aqueous solution and 1 ml. of a 1% ferric chloride aqueous solution. After thorough mixing, the said solution was then filtered through white filter paper, there was then added thereto 30 g. of ammonium bichromate crystals, and, when the latter became dissolved, 25 g. of sodium tetraborate was then added. The pH of the resulting top coat solution was 6.8.

(7) The previously base coated plate, produced in accordance with part 5 hereof, was placed in a tray and covered with the top coating solution of part 6 hereof, was so allowed to remain for 4 to 6 minutes, then drained, and the plate was placed on an edge and air dried in a dark room.

(8) The plate was now ready for exposure. In this connection, as is well understood in the art, the exposure time is determined, among other things, by the character of the negative utilized, said exposure time varying from a number of seconds to minutes depending, for example, upon the density of the negative. After exposure to actinic light under a negative, the plate was developed or washed in cold (55 degrees F., or lower) water until all of the unreacted ammonium bichromate was removed. The plate was then air dried.

(9) The plate produced in part 8 hereof was then soaked in glycerin, a step which, per se, is well known in the art. In this example, a solution of 1 part glycerin and 2 parts water was used although the concentration of glycerin can be widely varied, and the soaking of the plate in the glycerin solution was for a period of about 20 minutes although, here, again, the soaking time is quite variable. The excess glycerin solution was then squeegeed off the plate. The plate was now finished and ready for placing on the press.

In actual runs, under conditions of about 50% relative humidity and with no application of water on the press, in excess of 15,000 prints have been made with no scumming of the plate and with the prints exhibiting outstanding clarity and detail. The plate prints effectively immediately upon its completion and placement on the press and continues so to print even after it has been stored over periods of several weeks without any special reprocessing of the plate.

The procedures described in detail above are, of course, subject to wide variation.

Thus, for instance, the base coating and sensitized top coating can be applied to any suitable surface as, for instance, to zinc, steel, glass, porcelain, Celluloid, paper, regenerated cellulose, cellulose ether and cellulose ester sheets, and the like. Advantageously, in the case of metals, the plate is grained in accordance with conventional techniques but this is not essential to the practice of our invention.

The sorbitol serves a number of important functions so far as the achievement of the particularly preferred advantages of our invention is concerned. It appears to form a complex with the oxalic acid and the gelatin which acts as a reservoir for water, holding the water absorbed and gradually releasing it at an effective rate so as to prevent scumming and to make possible the obtaining of large numbers of impressions and outstandingly good storage life of the plates. The sorbitol, further, acts as a controlled but very slight hardener for the gelatin. In the making of the plate, as described above, it is unnecessary that the sorbitol be added in part 1. It may, for example, be added in parts 2 and 4. It is, however, particularly preferred that the addition be made in part 1. In carrying out the procedure of part 1 of the process, the sorbitol may be added before or after the addition of the oxalic acid. However, it is particularly desired that the oxalic be added after the sorbitol since improved results are obtained when such order of steps is carried out.

The amphetamine salts serve a number of important functions. One of these functions is as a controlled but slight hardener and another is to protect the plate against further hardening during storage as well as with reference to deterioration of the sensitizing bichromate on storage. The result is, as stated above, that the plates last for long periods of time, for example, of the order of weeks and even months. The amphetamine salts, further, in combination with the other ingredients utilized, render the hardened colloid more grease or ink receptive, they make for fine highlights and details and, in addition, they act as a preservative for the gelatin-oxalic acid complex. While, in the above specific illustrative example, the amphetamine salt is utilized in both parts 2 and 3, it may be noted that said amphetamine salts work effectively when added either in part 2 or in part 3. The amounts of amphetamine sulfate or other amphetamine salts, for instance, the chloride, acetate, phosphate, etc. utilized can be varied substantially. They may go as low as, for example, 0.1% and as high as about 50% based on the weight of the dry gelatin. It is preferred, however, to utilize proportions of amphetamine sulfate or other amphetamine salts in the range of about 3% to about 7% based on the weight of the dry gelatin.

It is particularly advantageous to utilize the tetraborates in combination with the oxalic acid, in the manner described above, because better highlights and tone values appear to be obtained as a result thereof.

In the top coat, the ferric chloride serves as a hardener and, as previously indicated, the amphetamine salt also, in part, similarly functions. Other hardeners which may be used in place of the ferric chloride include optical brighteners, atropine salts such as atropine sulfate, light absorbers, and the like.

It may be pointed out that it has heretofore been known in the art dealing with photographic processes to react gelatin with small proportions of oxalic acid and we do not assert any novelty in any such broad procedures. In such prior procedures, the reaction between the gelatin and the oxalic acid has been carried out in such a manner and the effect of the treatment of the gelatin with oxalic acid has been such that, when utilized in conjunction with an alkali metal bichromate sensitizer, the image formed is practically water-impenetrable but so grease-repellent that the coatings do not accept greasy developing inks readily and tend to refuse ink on the press.

In carrying out the treatment for the modification of the gelatin in accordance with our invention, the gelatin, in the form of a dilute solution in water, as stated above, reacts with the oxalic acid, preferably dissolved in the minimum amount of water in which the requisite amount of oxalic acid can be used is soluble. The concentration of gelatin in water is variable, good results being obtained with an aqueous solution containing 1 part of gelatin to from about 3 to about 18 parts of water, said parts being by weight. We find it very satisfactory to make a solution of 1 part of gelatin in about 6 parts of water and, for ease of handling, to maintain the solution at slightly elevated temperatures. The oxalic acid solution is added to the gelatin solution with agitation, particularly after the inclusion of the sorbitol in the solution. The amount of oxalic acid is somewhat variable, from about 2% to about 10%, usually about 2.5% to 3.5%, producing good results, said percentages being by weight of the gelatin contained in said gelatin solution.

It is particularly important, to the achievement of the best results in accordance with our present invention, to utilize both a base coat and a top coat in the manner generally described above. It is likewise important, to the obtaining of the optimum results of our invention, that the top coating or skin be extremely thin. While the thickness of the top coating is variable within limits, in general the thickness thereof, for best functioning, should be of the order of 0.00001 to 0.0002 inch and may be even less. The base coat is, in general, of materially greater thickness and will ordinarily fall within the range of 0.001 to 0.005 inch although it may be materially thicker when swelled by moisture. The particular types of top coat and base coat combinations serve, among other purposes, to bring about exceptional tone quality and detail in the impressions printed from the plates, the plates are protected against drying out, and storage life of the plates is enhanced.

The base coat, as indicated, is only slightly hardened so that, when the top coating is deposited thereon, the sensitizer, for instance, ammonium bichromate, penetrates partially into the base coating but not all of the way therethrough. The extent of such penetration is variable but, in general, it is desirable that the penetration does not extend through more than about ¾ of the thickness of said base coating.

The base coating may have an acid or alkaline pH and the top coating may likewise have an acid or alkaline pH. It is preferred, however, that, in both instances, the pH of both the base and the top coating be acid. While the finished printing plates of the present invention are operative whether on the acid side or on the alkaline side, so far as the coatings are concerned, it is particularly preferred to operate on the acid side, at a pH slightly under 7, for instance, 6.5 to 6.9, since the acid plates stand up in storage over prolonged periods of time.

The base coat composition advantageously contains from about 10% to 20% of gelatin, from about 0.1% to 0.2% of oxalic acid, from about 0.075% to 0.2% sorbitol, from about 0.4% to 1% alkali metal tetraborate where used, and the balance, from about 90% to 80%, water.

The top coat composition advantageously contains from about 2% to 4% of the light-sensitive water-soluble chromium compound, particularly the alkali metal (including ammonium) bichromate, from about 0.05% to 0.1% of the skin-forming colloid such as sodium carboxymethylcellulose or gelatin or polyvinyl alcohol or polyvinyl pyrrolidone, from about 0.15% to 0.4% of amphetamine salt, from about 1.5% to 3.5% alkali metal tetraborate where used, and from about 0.0005% to 0.001%, of ferric chloride or equivalent hardener.

We have also found it to be especially advantageous to incorporate organic optical brighteners or light absorbers into the coatings of our invention. These optical brighteners or light absorbers may be incorporated in either the base coat or the top or both. In general, best results are obtained when the optical brighteners or light absorbers are incorporated both in the base coating and in the top coating. The proportions of said optical brighteners or light absorbers, embodied in the aforesaid base and top coatings, are variable but, in general, will fall within the range of 0.05% to 0.1%, based on the weight of the gelatin. Typical of such optical brighteners and light absorbers which, per se, are well known as such in the art and various of which are commonly used in compositions for the treatment of cloth fabrics are, for instance, such products as are sold under the trade names of Uvitex P, Uvitex RS, Uvitex WGS, Uvitex WS (Ciba Pharmaceutical Products, Inc.), Tinopal (Geigy Co., Inc.), Solium (Lever Brothers Company), Univul MS–40 and Blancophor DS–86 (General Aniline & Film Corporation), and Cyasorb UV–24 (American Cyanamid Company). Various of them comprise umbelliferone and stilbene derivatives typical examples of which are disclosed, for instance, in U.S. Patent No. 2,528,323. Such and equivalent compounds, which are also disclosed in various other U.S. patents, have heretofore commonly been used to impart a whitening effect to textile materials, paper and the like. The said optical brighteners and light absorbers operate to provide unusually effective highlights and fine details in the prints made from the plates and they function, in the same general connection, as light restraining agents. They also have certain properties as light sensitizers but, in accordance with our present invention, the light sensitizing properties are mainly imparted to the top coating through the utilization of bichromates.

As we have previously pointed out, printing plates made in accordance with our present invention, as described above, for use particularly in the lithographic industry, have a number of significant advantages. Irradiation or side spreading of the light is essentially obviated, our plates permitting the proper amount of exposure on negatives of various density, while not affecting the value of the images of the more open negatives. Overexposures of substantial magnitude do not, in many cases, adversely affect the details of the finished prints. Truer reproduction than has heretofore been possible with existing printing plates of the colloid type is obtained. In all previous plates of the gelatin colloid type of which we are aware, the images, after a reasonsable run, have a tendency to sharpen with the result that prints are made which do not carry a true tone value of the original copy. Where, however, the teachings of our present invention are used, the result is to obtain true images with sharp detail and high tonal values which hold through many thousands of impressions without sharpening.

While the particularly significant features of our invention center around improvements in lithographic printing plates, various of the teachings provided herein are of substantial value in other fields. One example is in connection with X-ray films. Present types of X-ray films are essentially colored blind emulsions which are particularly sensitive to ultra-violet rays in the short end of the spectrum. Such X-ray films, like all other films, are subject to a certain amount of expansion of the image which has a tendency to destroy the detail. By application of coatings such as have been described above utilizing silver salt sensitizers, new types of X-ray films can be prepared which are capable of carrying very substantially more detail than is now achievable with present X-ray films. The necessity for effective detail is particularly important in order to enbale the medical profession to obtain more accurate and definite diagnoses. The gelatin coatings made in the manner described above but substituting silver salts as the sensitizer in place of the bichromates, and depositing the resulting coatings on X-ray types of film materials, makes possible marked improvements in the field of X-ray films.

Our invention also has applicability to the microfilm field where, again, detail is particularly important. The coating compositions of our invention with suitably chosen sensitizers, such as are used in microfilm, open up new avenues for improvements in this particular area.

Still another field in which the teachings of our invention can be expected to play a definite role are in the amateur photography field. Here, amateurs can be supplied with plates made in accordance with our invention and, by the proper application of known chemicals, there can be made with such plates one's own colored prints. Such prints are capable of being made in sizes and quantity which, in comparison with present methods, sharply reduce the cost. Thus, for instance, for an extra print all that would be involved would be only the cost of a small amount of printing ink plus a sheet of paper coupled with the amateur or hobbyist's labor. The sizes is controlled solely by the enlarging equipment. Color correction can be obtained by the use of one simple mask which the amateur or hobbyist can make at the same time he makes his color separation.

We claim:

1. In a method of preparing lithographic printing plates, the steps which comprise (a) forming an aqueous solution containing gelatin, sorbitol and oxalic acid, (b) forming an aqueous solution containing gelatin, sorbitol and an amphetamine salt, admixing solutions (a) and (b), coating said solution onto a base member and drying said coating, then coating said base-coated member with an aqueous sensitizer solution containing an amphetamine salt, a colloid selected from the group of sodium carboxymethylcellulose, gelatin, polyvinyl alcohol and polyvinyl pyrrolidone, ferric chloride, and a water-soluble bichromate, and drying said sensitizer coating.

2. In a method of preparing lithographic printing plates, the steps which comprise (a) forming an aqueous solution containing gelatin and sorbitol, adding a solution of oxalic acid thereto and allowing the mixture to stand for at least several minutes, (b) forming an aqueous solution containing gelatin, sorbitol, an alkali metal tetraborate and an amphetamine salt, admixing solutions (a) and (b), coating said solution onto a base member and drying said coating, then coating said base-coated member with an aqueous sensitizer solution containing an amphetamine salt, a colloid selected from the group consisting of sodium carboxymethylcellulose, gelatin, polyvinyl alcohol and polyvinyl pyrrolidone, a hardener, and a water-soluble bichromate, and drying said sensitizer coating.

3. In a method of preparing lithographic printing plates, the steps which comprise (a) forming an aqueous solution containing gelatin, sorbitol, oxalic acid and an amphetamine salt, (b) forming an aqueous solution containing gelatin, sorbitol, potassium tetraborate and an amphetamine salt, admixing solutions (a) and (b), coating said last-mentioned solution onto a base member and drying said coating, then coating said base-coated member with an aqueous sensitizer solution containing an amphetamine salt, sodium carboxymethyl cellulose, ferric chloride, a water-soluble bichromate and sodium tetraborate, and drying said sensitizer coating.

4. In a method of preparing lithographic printing plates, the steps which comprise (a) forming an aqueous solution containing gelatin, sorbitol, oxalic acid and amphetamine sulfate, (b) forming an aqueous solution containing gelatin, sorbitol, potassium tetraborate and amphetamine sulfate, admixing solutions (a) and (b) to produce an acidic solution, coating said last-mentioned solution onto a base member and drying said coating, then coating said base-coated member with an acidic aqueous sensitizer solution containing amphetamine sulfate, sodium carboxymethyl cellulose, ferric chloride, a water-soluble bichromate and sodium tetraborate, and drying said sensitizer coating.

5. In the production of an improved lithographic base coating composition, the steps which comprise (a) forming an aqueous solution containing gelatin, sorbitol, oxalic acid and an amphetamine salt, (b) forming an aqueous solution containing gelatin, sorbitol, an alkali metal tetraborate and an amphetamine salt, and (c) admixing solutions (a) and (b).

6. In the production of improved lithographic base coating compositions, the steps which comprise (a) forming an aqueous solution containing gelatin, oxalic acid and an amphetamine salt, (b) forming an aqueous solution containing gelatin, potassium tetraborate and an amphetamine salt, and (c) admixing solutions (a) and (b).

7. In the production of an improved lithographic base coating composition, the steps which comprise (a) forming an aqueous solution containing gelatin, sorbitol, oxalic acid and amphetamie sulfate, (b) forming an aqueous solution containing gelatin, sorbitol, potassium tetraborate and amphetamine sulfate, and (c) admixing solutions (a) and (b) to produce an acidic solution.

8. In the production of improved lithographic base coating compositions, the steps which comprise (a) forming an aqueous solution containing gelatin, oxalic acid and amphetamine sulfate, (b) forming an aqueous solution containing gelatin, potassium tetraborate and amphetamine sulfate, and (c) admixing solutions (a) and (b) to produce an acidic solution.

9. In the production of an improved lithographic base coating composition, the steps which comprise (a) forming an aqueous solution containing gelatin, sorbitol and oxalic acid, (b) forming an aqueous solution containing gelatin, sorbitol, an alkali metal tetraborate and an amphetamine salt, and (c) admixing solutions (a) and (b).

10. In the production of improved lithographic base coating compositions, the steps which comprise (a) forming an aqueous solution containing gelatin and sorbitol, adding oxalic acid and allowing the solution to stand for at least several minutes, (b) forming an aqueous solution containing gelatin, potassium tetraborate and an amphetamine salt, and (c) admixing solutions (a) and (b).

11. A new and improved lithographic printing plate comprising a base member, a base coating supported on said base member, said base coating containing an amphetamine salt and a complex resulting from the reaction of gelatin and oxalic acid in the presence of sorbitol, a top coat disposed over and in adherent relation to said base coat, said top coat containing an amphetamine salt sodium carboxymethyl cellulose, a hardener, sodium tetraborate, and a bichromate sensitizer, said plate being essentially non-reticulated and being characterized by the ability to permit the penetration of light through said coatings in substantially straight lines as distinguished from the spreading of light rays characteristic of gelatin coated printing plates.

12. A new and improved lithographic printing plate comprising a base member, a base coating supported on said base member, said base coating containing an amphetamine salt and a complex resulting from the reaction of gelatin and oxalic acid in the presence of sorbitol and an alkali metal tetraborate, a top coat disposed over and in adherent relation to said base coat, said top coat containing an amphetamine salt, a hardener, a colloid which forms a thin skin selected from the group consisting of sodium carboxymethylcellulose, gelatin, polyvinyl alcohol and polyvinyl pyrrolidone, alkali metal tetraborate, and a bichromate sensitizer, said plate being essentially non-reticulated and being characterized by the ability to permit the penetration of light through said coatings in substantially straight lines as distinguished from the spreading of light rays characteristic of gelatin coated printing plates.

13. A new and improved lithographic printing plate comprising a base member, a base coating supported on said base member, said base coating containing an amphetamine salt and a complex resulting from the reaction of gelatin and oxalic acid in the presence of sorbitol, said base coating being acidic, a top coat disposed over and in adherent relation to said base coat, said top coat containing an amphetamine salt, ferric chloride, sodium carboxymethyl cellulose, sodium tetraborate, and a bichromate sensitizer, said top coat having an acidic reaction, said plate being essentially non-reticulated and being characterized by the ability to permit the penetration of light through said coatings in substantially straight lines as distinguished from the spreading of light rays characteristic of gelatin coated printing plates.

14. A new and improved light-sensitized article comprising a base member, a base coating supported on said base member, said base coating containing an amphetamine salt and a complex resulting from the reaction of gelatin with oxalic acid in the presence of sorbitol, said base coating being acidic, a top coat disposed over and in adherent relation to said base coat, said top coating containing an amphetamine salt, a hardener, a colloid which forms a thin skin selected from the group consisting of sodium carboxymethylcellulose, gelatin, polyvinyl alcohol and polyvinyl pyrrolidone, and a light sensitizer selected from the group consisting of silver compounds, diazo dyes and water-soluble chromic salts, said top coat having an acidic reaction.

15. A new and improved light-sensitized article comprising a base member, a base coating supported on said base member, said base coating containing an amphetamine salt and a complex resulting from the reaction of gelatin with oxalic acid, a top coat in the form of a thin skin disposed over and in adherent relation to said base coat, said top coat containing a skin-forming colloid selected from the group consisting of sodium carboxymethylcellulose, gelatin, polyvinyl alcohol and polyvinyl pyrrolidone and a light sensitizer selected from the group consisting of silver compounds, diazo dyes and water-soluble chromic salts.

16. A substantially non-reticulated gelatin printing plate comprising a base, a substantially non-reticulated gelatin base coating carried by said base, said base coating being only partially hardened and embodying therein amphetamine sulfate and a complex resulting from the reaction of gelatin and oxalic acid in the presence of sorbitol, said complex having the capacity of binding water therein and gradually releasing it therefrom, and a top coat overlying said base coating and adherent thereto, said top coat comprising sodium carboxymethyl cellulose, amphetamine sulfate, sodium tetraborate and a bichromate sensitizer, said plate having the ability, when initially soaked in a mixture of glycerin and water, to print, without scumming, large numbers of impressions under conditions of mild relative humidity and without the application of water on the press.

17. A substantially non-reticulated gelatin printing plate comprising a base, a substantially non-reticulated gelatin base coating carried by said base, said base coating being only partially hardened and embodying therein a complex resulting from the reaction of gelatin and oxalic acid in the presence of sorbitol and an alkali metal tetraborate, said complex having the capacity of binding water therein and gradually releasing it therefrom, and a top coat overlying said base coating and adherent thereto, said top coat comprising sodium carboxymethyl cellulose, an amphetamine salt, an alkali metal tetraborate and a bichromate sensitizer, said plate having the ability, when initially soaked in a mixture of glycerin and water, to print, without scumming, large numbers of impressions under conditions of mild relative humidity and without the application of water on the press.

18. A substantially non-reticulated gelatin printing plate comprising a base, a substantially non-reticulated gelatin base coating carried by said base, said base coating being only partially hardened and embodying therein a complex resulting from the reaction of gelatin and oxalic acid in the presence of sorbitol, said complex having the capacity of binding water therein and gradually releasing it therefrom, and a top coat overlying said base coating and adherent thereto, said top coat comprising a colloid selected from the group consisting of sodium carboxymethylcellulose, gelatin, polyvinyl alcohol and polyvinyl pyrrolidone, an amphetamine salt, and a bichromate sensitizer, said plate having the ability, when initially soaked in a mixture of glycerin and water, to print, without scumming, large numbers of impressions under conditions of relatively low relative humidity and without the application of water on the press.

19. As a new article of manufacture, a base member, a substantially non-reticulated gelatin only partially hardened base coating supported on said base member, said base coating carrying moisture and sorbitol and including a complex resulting from the reaction of gelatin and oxalic acid, and a top coat in the form of a thin colloid skin selected from the group consisting of sodium carboxymethylcellulose, gelatin, polyvinyl alcohol and polyvinyl pyrrolidone, carrying a light sensitizer in the form of a bichromate.

20. As a new article of manufacture, a base member, a substantially non-reticulated gelatin only partially hardened base coating supported on said base member, said base coating carrying moisture and comprising a complex resulting from the reaction of gelatin and oxalic acid in the presence of sorbitol, and a top coat in the form of a thin colloid skin selected from the group consisting of sodium carboxymethylcellulose, gelatin, polyvinyl alcohol and polyvinyl pyrrolidone, carrying a light sensitizer selected from the group consisting of silver compounds, diazo dyes and water-soluble chromic salts in the form of a bichromate.

21. A substantially non-reticulated gelatin printing plate, said plate comprising an only partially hardened base coating supported on a base member, said base coating carrying moisture and sorbitol and including a complex resulting from the reaction of gelatin and oxalic acid, and a top coat in the form of a thin colloid skin selected from the group consisting of sodium carboxymethylcellulose, gelatin, polyvinyl alcohol and polyvinyl pyrrolidone, carrying a light sensitizer selected from the group consisting of silver compounds, diazo dyes and water-soluble chromic salts, said plate being characterized by the ability to transmit light therethrough in substantially straight lines as contrasted with light spreading characteristic of reticulated gelatin printing plates.

22. A substantially non-reticulated gelatin printing plate, said plate comprising an only partially hardened base coating supported on a base member, said base coating carrying moisture and comprising a complex resulting from the reaction of gelatin and oxalic acid in the presence of sorbitol, and a top coat in the form of a thin colloid skin selected from the group consisting of sodium carboxymethylcellulose, gelatin, polyvinyl alcohol and polyvinyl pyrrolidone, carrying a light sensitizer in the form of a bichromate, said plate being characterized by the ability to transmit light therethrough in substantially straight lines as contrasted with light spreading characteristic of reticulated gelatin printing plates.

23. A lithographic printing plate in accordance with claim 11, wherein at least one of the base coating and top coat has embodied therein at least one member selected from the group consisting of organic light absorbing agents and organic optical brighteners.

24. A lithographic printing plate in accordance with claim 18, wherein at least one of the base coating and top coat has embodied therein at least one member selected from the group consisting of organic light absorbing agents and organic optical brighteners.

25. A lithographic printing plate in accordance with claim 21, wherein at least one of the base coating and top coat has embodied therein at least one member selected from the group consisting of organic light absorbing agents and organic optical brighteners.

26. A lithographic printing plate in accordance with claim 22, wherein at least one of the base coating and top coat has embodied therein at least one member selected from the group consisting of organic light absorbing agents and organic optical brighteners.

References Cited

UNITED STATES PATENTS

| | | | |
|---|---|---|---|
| 2,426,935 | 9/1947 | Kramsky et al. | 106—136 X |
| 2,434,906 | 1/1948 | Carlton et al. | 106—136 X |
| 2,534,050 | 12/1950 | Murray | 96—111 X |
| 2,598,189 | 5/1952 | Mullen | 96—33 |
| 2,686,732 | 8/1954 | Montgomery et al. | 106—136 X |
| 3,028,308 | 4/1962 | Zambito et al. | 260—117 X |
| 3,334,584 | 8/1967 | Sites | 96—33 X |

OTHER REFERENCES

Zelikman et al., Making and Coating Photographic Emulsions, 1964, p. 38.

GEORGE F. LESMES, Primary Examiner

R. E. MARTIN, Assistant Examiner

U.S. Cl. X.R.

96—33; 101—453, 463; 106—125, 136; 117—34